United States Patent
Osias

(10) Patent No.: US 7,398,291 B2
(45) Date of Patent: Jul. 8, 2008

(54) METHOD, SYSTEM AND PROGRAM PRODUCT FOR PROVIDING A STATUS OF A TRANSACTION WITH AN APPLICATION ON A SERVER

(75) Inventor: Michael J. Osias, Budd Lake, NJ (US)

(73) Assignee: International Business Machines Corporation, Armonk, NY (US)

( * ) Notice: Subject to any disclaimer, the term of this patent is extended or adjusted under 35 U.S.C. 154(b) by 1132 days.

(21) Appl. No.: 10/606,985

(22) Filed: Jun. 26, 2003

(65) Prior Publication Data

US 2004/0267878 A1 Dec. 30, 2004

(51) Int. Cl.
G06F 15/16 (2006.01)
(52) U.S. Cl. .................. 709/203; 709/224; 709/231; 725/16
(58) Field of Classification Search .......... 709/203, 709/224, 231; 725/16
See application file for complete search history.

(56) References Cited

U.S. PATENT DOCUMENTS 5,754,772 A 5/1998 Leaf 6,385,636 B1 * 5/2002 Suzuki ................ 718/105
6,434,651 B1 * 8/2002 Gentry, Jr. ............ 710/260
6,769,019 B2 * 7/2004 Ferguson .............. 709/219
2002/0065911 A1 5/2002 von Klopp et al.
2004/0107267 A1 * 6/2004 Donker et al. .......... 709/218

FOREIGN PATENT DOCUMENTS

WO WO0142908 A2 6/2001

* cited by examiner

Primary Examiner—Saleh Najjar
Assistant Examiner—Thuong (Tina) T Nguyen
(74) Attorney, Agent, or Firm—Arthur J. Samodovitz; Hoffman Warnick LLC

(57) ABSTRACT

Under the present invention, polling code is generated on a server and sent to a client in response to a transaction request received on the server from the client. The polling code includes a set of parameters such as a delay time and a polling count. After expiration of the delay time, the client will poll the server to request the status of the requested transaction. If the transaction is complete, the client will be redirected to a completion page. If the transaction is incomplete, and a polling count limit has not been reached, new polling code will be generated that includes the delay time and a new polling count. The new polling count is generated by incrementing the old polling count by one. The polling cycle is repeated until the transaction is complete, or the polling count limit is reached.

7 Claims, 2 Drawing Sheets

METHOD, SYSTEM AND PROGRAM PRODUCT FOR PROVIDING A STATUS OF A TRANSACTION WITH AN APPLICATION ON A SERVER

BACKGROUND OF THE INVENTION

1. Field of the Invention

In general, the present invention provides a method, system and program product for providing a status of a transaction with an application on a server. Specifically, the present invention allows a server to be polled from a client to detect the status of a transaction independent of a persistent network connection.

2. Related Art

As computer technology becomes more advanced, computer users are increasingly being provided with the capability to conduct business and/or personal transactions from their home or office computers. For example, today a computer user can purchase goods/services, pay bills and manage a business over a computer network such as the Internet. In general, a network-based transaction occurs in a client-server environment with the computer system operated by the user being the client, and the computer system with which the client communicates being the server. To conduct a transaction, the client will typically establish a connection with the server and then transmit a request (e.g., a HTTP request) thereto. Upon receipt, the server will invoke one or more applications to process the request.

Unfortunately, as is well known, network connections between a client and a server often suffer various interruptions. Such interruptions can be due to, for example, a high volume of network traffic being received by the server, service provider errors, etc. In any event, the interruption of the connection often leads to loss of data, which can undermine the transaction being requested by the client. This is especially the case where the transaction takes an appreciable amount of time to process. For example, if a computer user is attempting to purchase goods on-line, the transaction could involve verifying credit card information. Verifying credit card information can require an application on the server to interact with one or more "external resources" (e.g., a bank). As such, verification of credit card information can often take several minutes.

While the transaction is being processed, status information is often desired by the computer user (especially for more time consuming transactions such as credit card verification). Specifically, the computer user often wishes to know whether the transaction is still pending, has been completed or has timed out. Previous systems for communicating transaction information to the computer users, however, all relied upon a persistent connection between the client and the server. Under such systems, as the connections were interrupted, the status information was lost or delayed. Since the persistence of a connection between a server and client is extremely difficult if not impossible to ensure, the previous systems failed to provide a reliable way of obtaining transaction status information.

In view of the foregoing, there exists a need for a method, system and program product for providing a status of a transaction with an application on a server. Specifically, a need exists for a system that allows a server to be polled from a client to detect the status of a transaction on a server. To this extent, a need exists for a system that allows a "stateful" relationship between a client and server to be maintained independent of a persistent network connection. A further need exists for a system that provides a flexible/defineable polling cycle and algorithm that is based on standard Internet technology components, and that is concealed from an end user.

SUMMARY OF THE INVENTION

In general, the present invention provides a method, system and program product for providing a status of a transaction with an application on a server. Specifically, under the present invention, a request for a transaction is communicated to the server from a client (e.g., from a browser on the client). A server agent on the server will initiate the transaction by invoking an application to process the request. Thereafter, the server agent will call a client code generator, which will generate polling code. Typically, the polling code includes a Uniform Resource Locator (URL) that includes a set of parameters and identifies the transaction requested. The set of parameters generally includes a polling count and a delay time. The polling code is communicated to the client, which after the delay time, will poll the server for a status of the transaction by communicating the URL to the server agent. Upon receipt, the server agent will use the information in the URL to determine the status of the transaction. If the transaction is complete, the client code generator will redirect the client to a completion (web) page. If the transaction is not complete, and the polling count identified in the URL equals a polling count limit, the client is redirected to an exception (web) page. However, if the transaction is not complete and the polling count limit has not been reached, the client code generator will generate a new polling code and the cycle will be repeated until the limit is reached or the transaction is complete.

A first aspect of the present invention provides a method for providing a status of a transaction with an application on a server, comprising: receiving a request for a transaction on the server from a client; invoking the application on the server to process the request; generating a first polling code having a first Uniform Resource Locator (URL) that includes a first set of parameters, and sending the first polling code to the client; and communicating the first URL from the client to the server to request the status of the transaction.

A second aspect of the present invention provides a method for providing a status of a transaction with an application on a server, comprising: receiving a HTTP request for a transaction on the server from a browser on a client; invoking the application on the server to process the HTTP request; calling a client code generator on the server to generate a first polling code having a first Uniform Resource Locator (URL) that includes a first set of parameters, wherein the first set of parameters comprises a delay time and a polling count; sending the first polling code to the browser; and communicating the first URL in the first polling code from the browser to a server agent on the server after expiration of the delay time to request the status of the transaction.

A third aspect of the present invention provides a system for providing a status of a transaction with an application on a server, comprising: a server agent for receiving a request for the transaction from a client, and for initiating the transaction based on the request; a client code generator invoked by the server agent for generating a first polling code having a first Uniform Resource Locator (URL) that includes a first set of parameters, and for sending the first polling code to the client, wherein the client communicates the first URL to the server agent to request the status of the transaction.

A fourth aspect of the present invention provides a program product stored on a recordable medium for providing a status of a transaction with an application on a server, which when executed, comprises: agent program code configured to receive a request for the transaction from a client, and to initiate the transaction based on the request; generator program code invoked by the agent program code configured to generate a first polling code having a first Uniform Resource Locator (URL) that includes a first set of parameters, and to send the first polling code to the client, wherein the client communicates the first URL to the agent program code to request the status of the transaction.

Therefore, the present invention provides a method, system and program product for providing a status of a transaction with an application on a server.

BRIEF DESCRIPTION OF THE DRAWINGS

These and other features of this invention will be more readily understood from the following detailed description of the various aspects of the invention taken in conjunction with the accompanying drawings in which.

Figure 1:
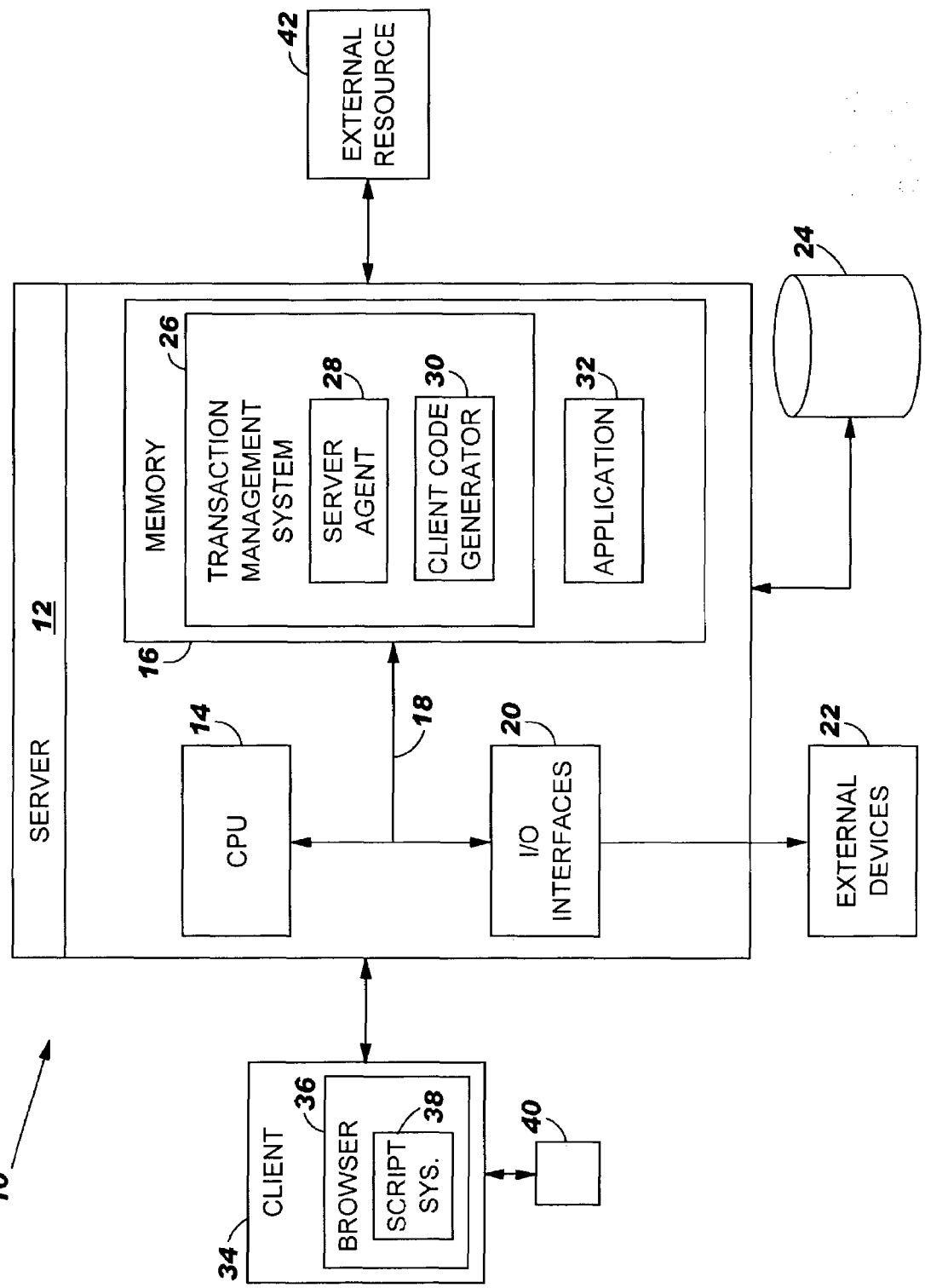
FIG. 1 depicts a system for providing a status of a transaction with an application on a server, according to the present invention.

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

As indicated above, the present invention provides a method, system and program product for providing a status of a transaction with an application on a server. Specifically, under the present invention, a request for a transaction is communicated to the server from a client (e.g., from a browser on the client). A server agent on the server will initiate the transaction by invoking an application to process the request. Thereafter, the server agent will call a client code generator, which will generate polling code. Typically, the polling code includes a Uniform Resource Locator (URL) that includes a set of parameters and identifies the transaction requested. The set of parameters generally includes a polling count and a delay time. The polling code is communicated to the client, which after the delay time, will poll the server for a status of the transaction by communicating the URL to the server agent. Upon receipt, the server agent will use the information in the URL to determine the status of the transaction. If the transaction is complete, the client code generator will redirect the client to a completion (web) page. If the transaction is not complete, and the polling count identified in the URL equals a polling count limit., the client is redirected to an exception (web) page. However, if the transaction is not complete and the polling count limit has not been reached, the client code generator will generate a new polling code and the cycle will be repeated until the limit is reached or the transaction is complete. Therefore, the present invention allows a status of a transaction to be provided without relying on a persistent network connection between the server and the client. Moreover, the present invention allows the polling to be concealed from the user.

Referring now to FIG. 1, a system 10 for providing a status of a transaction with an application 32 on server 12 is shown. In general, client 34 will communicate with server 12 to conduct a transaction and obtain transaction status information. To this extent, client 34 is intended to represent any type of computerized system that is capable of communicating with server 12. For example, client 34 could be a personal computer, a laptop, a workstation, a hand held device, etc. In any event, as depicted, server 12 generally comprises central processing unit (CPU) 14, memory 16, bus 18, input/output (I/O) interfaces 20, external devices/resources 22 and storage unit 24.

CPU 14 may comprise a single processing unit, or be distributed across one or more processing units in one or more locations e.g., on a client and server. Memory 16 may comprise any known type of data storage and/or transmission media, including magnetic media, optical media, random access memory (RAM), read-only memory (ROM), a data cache, a data object, etc. Moreover, similar to CPU 14, memory 16 may reside at a single physical location, comprising one or more types of data storage, or be distributed across a plurality of physical systems in various forms.

I/O interfaces 20 may comprise any system for exchanging information to/from an external source. External devices/resources 22 may comprise any known type of external device, including speakers, a CRT, LCD screen, hand-held device, keyboard, mouse, voice recognition system, speech output system, printer, monitor/display, facsimile, pager, etc. Bus 18 provides a communication link between each of the components in server 12 and likewise may comprise any known type of transmission link, including electrical, optical, wireless, etc.

Storage unit 24 can be any system (e.g., a database) capable of providing storage for information such as transaction information, parameters, URLs, etc. under the present invention. As such, storage unit 24 could include one or more storage devices, such as a magnetic disk drive or an optical disk drive. In another embodiment, storage unit 24 includes data distributed across, for example, a local area network (LAN), wide area network (WAN) or a storage area network (SAN) (not shown). It should also be understood that although not shown, additional components, such as cache memory, communication systems, system software, etc., may be incorporated into server 12. It should be understood that although not shown, client 34 will typically include computer components similar to server 12.

Communication between server 12 and client 34 could occur via any known manner. For example, such communication could occur via a direct hardwired connection (e.g., serial port), or via an addressable connection that may utilize any combination of wireline and/or wireless transmission methods. In any event, server 12 and client 34 may be connected via the Internet, a wide area network (WAN), a local area network (LAN), a virtual private network (VPN) or other private network. Server 12 and client 34 may utilize conventional network connectivity, such as Token Ring, Ethernet, WiFi or other conventional communications standards. Where client 34 communicates with server 12 via the Internet, connectivity could be provided by conventional TCP/IP sockets-based protocol. In this instance, client 34 would utilize an Internet service provider to establish connectivity to the server.

Shown in memory 16 of server 12 is transaction management system 26 and application 32. Transaction management system 26 includes server agent 28 and client code generator 30. Server agent 28 can be implemented using any known technology. For example, server agent 28 could be a servlet, and Enterprise Java Bean (EJB), etc. In any event, when user 40 wishes to interact with server 12 (e.g., to purchase goods/services online), user 40 will input information into browser 36. Such information could include, for example, credit card information that must be verified. In this example, the credit card information will be transmitted to server 12 as a (Hypertext Transfer Protocol "HTTP") request. Upon receipt, server agent 28 will initiate the transaction (e.g., credit card verification) by invoking application 32 to process the request. For example, application 32 could be a financial processing application. In verifying the credit card information, application 32 might communicate with one or more external resources 42 (e.g., a banking infrastructure). To this extent, external resource 42 could include personnel, hardware, software, or any combination thereof. Regardless, after invoking application 32, server agent 28 will initiate/call client code generator 30, which will generate polling code.

In a typical embodiment, client code generator 30 generates polling code that can be run by script system 38 within browser 36. Typically, the polling code includes a URL that includes a set of parameters and identifies the transaction that Was requested (e.g., credit card verification). Typically, the set of parameters are derived from a configuration of server agent 28. To this extent, the set of parameters can be hard-coded into server agent 28, derived from a configuration file that is accessible to server agent 28, etc. In any event, the configuration of server agent 28 generally includes a delay time, a polling count and a polling count limit. The delay time dictates how long the polling code is suspended in browser 36 before execution by script system 38. The polling count indicates how many polling cycles have been processed. The polling count limit dictates the maximum number of polling cycles to be performed before the polling loop is exited and an exception is generated. Listed below is an illustrative parameter configuration of server agent 28.

| PARAMETER | VALUE | DESCRIPTION |
|---|---|---|
| Delay | 15 Seconds | How long execution of polling code is suspended in browser |
| Polling Count | 1 | How many polling cycles have been processed |
| Polling Count Limit | 3 | How many polling cycles occur before polling loop is exited |

Based on this configuration, client code generator 30 will generate polling code having the following parameters:

| PARAMETER | VALUE | DESCRIPTION |
|---|---|---|
| Delay | 15 Seconds | How long execution of polling code is suspended in browser |
| Polling Count | 1 | How many polling cycles have been processed |

These parameters are included in the polling code as a URL that also identifies the transaction requested. The polling code is sent to browser 36. Upon receipt, script system 38 will execute the polling code after expiration of the delay time (e.g., 15 seconds). Execution of the polling code will cause client 34 to poll server 12 to request the status of the transaction by communicating the URL from browser 36 to server agent 28. Upon receipt, server agent 28 will process the URL to check the status of the transaction (e.g., by querying application 32 or a transaction monitor, etc.). If the transaction is complete, server agent 28 will call client code generator 30, which will generate and communicate completion code to client 34. The completion code causes browser 36 to be redirected to a completion (web) page. If, however, the transaction is not complete, server agent 28 will compare the polling count in the URL to the polling count limit in its configuration. In this example, the polling count is "1" and the polling count limit is "3." Accordingly, the limit has not been reached.

Since the polling count limit has not been reached, server agent 28 will repeat the cycle by calling client code generator 30 to generate a second polling code with the following values.

| PARAMETER | VALUE | DESCRIPTION |
|---|---|---|
| Delay | 15 Seconds | How long execution of polling code is suspended in browser |
| Polling Count | 2 | How many polling cycles have been processed |

As can be seen, the delay time remained the same, but the polling count has been incremented by one. These parameters are included in the second polling code as a second URL that also identifies the transaction. Similar to the first polling code, the second polling code is sent to browser 26 on client 34. After expiration of the delay time, script system 38 will execute the second polling code. That is, client 34 will poll server 12 to request the status of the transaction by communicating the second URL from browser 36 to server agent 28. Upon receipt, server agent 28 will again check the status of the transaction. If the transaction is complete, server agent 28 will call client code generator 30, which will communicate completion code to client 34 that causes browser 36 to be redirected to a completion (web) page. If the transaction is not yet complete, server agent 28 will determine whether the polling count limit of "3" has been reached. Since, the polling count in the second URL is "2" and the polling count limit is "3," the polling count limit has not been reached.

In this case, server agent 28 will once again call client code generator 30 to generate a third polling code. In generating the third polling code, client code generator 30 will increment the polling count by one. Accordingly, the following values will result:

| PARAMETER | VALUE | DESCRIPTION |
|---|---|---|
| Delay | 15 Seconds | How long execution of polling code is suspended in browser |
| Polling Count | 3 | How many polling cycles have been processed |

These parameters will be included in a third URL that also identifies the transaction. Similar to the previous cycles, the third polling code including the third URL is sent to browser 36 on client 34. After expiration of the delay time, script system 38 will execute the third polling code. That is, server 12 will be polled by communicating the third URL from browser 36 on client 34 to server agent 28. Upon receiving the third URL, server agent 28 will once again determine the status of the transaction. If the transaction is complete, server agent 28 will call client code generator 30, which will generate completion code that causes browser 36 to be redirected to a completion (web) page. However, if the transaction is not complete, server agent 28 will determine whether the polling count limit has been reached. Since the polling count identified in the third URL is "3" and the polling count limit is "3," the polling count limit has been reached in this example. Since the transaction is incomplete and the polling count limit has been reached, the cycle ends. Thus, server agent 28 will call client code generator 30, which will generate exception code. The exception code is communicated to client 34 and causes browser 36 to be redirected to an exception (Web) page.

Figure 2:
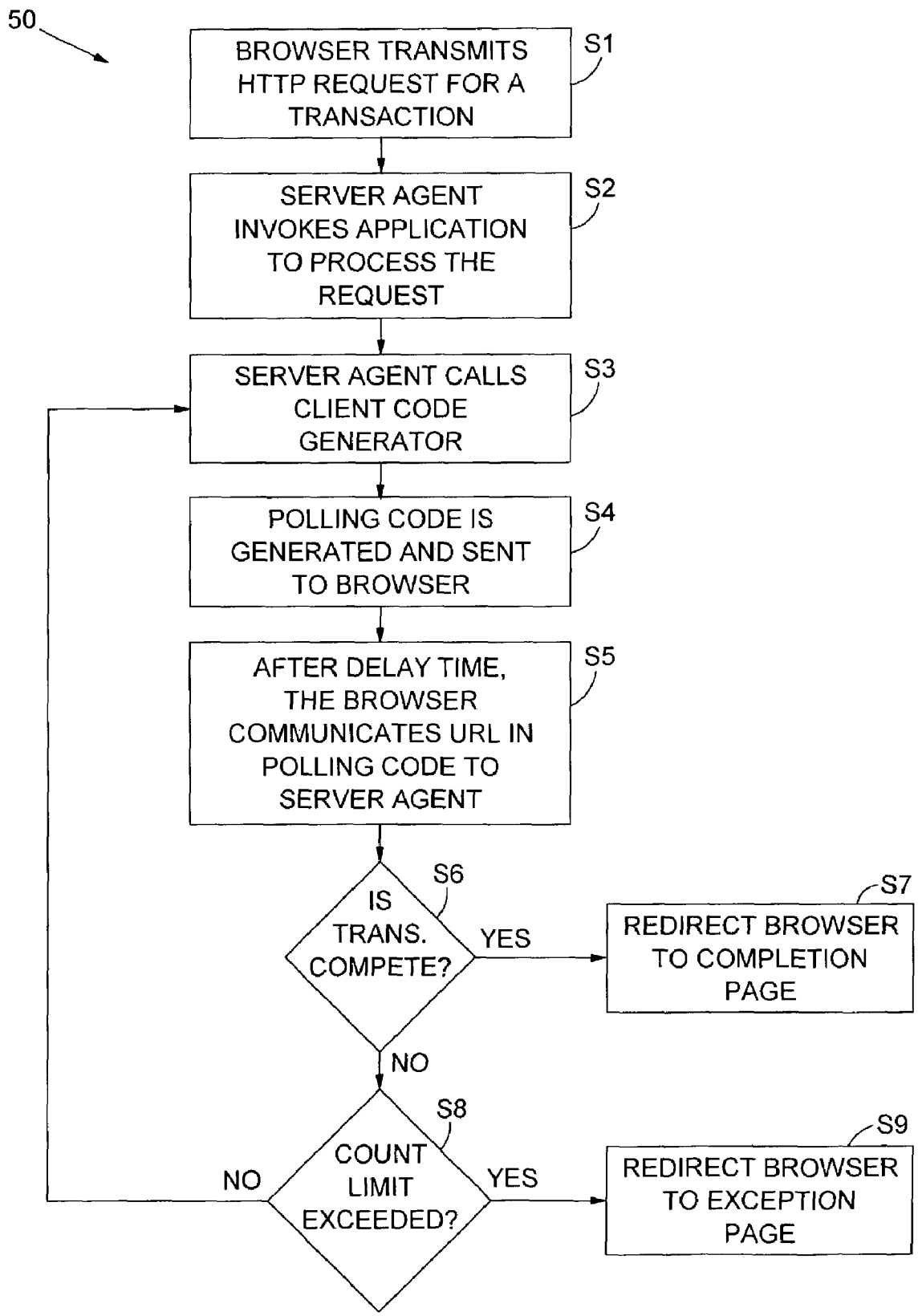
FIG. 2 depicts method flow diagram, according to the present invention.

Referring now to FIG. 2, a method flow diagram 50 according to the present invention is shown. As depicted, first step S1 in method 50 is to transmit a request for a transaction from the browser to the server. In step S2, the server agent will initiate the transaction by invoking an application to process the request. In step S3, the server agent will call the client code generator. In step S4, the client code generator will generate and send polling code to the browser. As indicated above, the polling code is based on a configuration of the server agent and includes the parameters of delay time and polling count. The parameters as well as transaction are identified in a URL within the polling code that is sent to the browser. In step S5, the browser will communicate the URL in the polling code to the server agent after expiration of the delay time. In step S6, the server agent will determine whether the transaction is complete. If the transaction is complete, the server agent will call the client code generator, which will generate completion code to redirect browser to a completion page in step S7. If the transaction was not complete, the server agent will determine whether the polling count limit has been reached in step S8. If it has the client code generator will be called and will generate exception code to redirect the browser to an exception page in step S9. If, however, the polling count limit has not been reached, the server agent will call the client code generator to generate a new polling code so that the cycle can be repeated.

It should be understood that the present invention can be realized in hardware, software, or a combination of hardware and software. Any kind of computer/server system(s)—or other apparatus adapted for carrying out the methods described herein—is suited. A typical combination of hardware and software could be a general purpose computer system with a computer program that, when loaded and executed, carries out the respective methods described herein. Alternatively, a specific use computer, containing specialized hardware for carrying out one or more of the functional tasks of the invention, could be utilized. The present invention can also be embedded in a computer program product, which comprises all the respective features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the preferred embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims. For example, although the present invention was described in the context of credit card verification, the teachings described herein can be used to provide a status of any type of transaction. Moreover, it should be understood that the values of the parameters used herein are intended to be illustrative only.

I claim:

1. A method for providing a status of a transaction with an application on a server, comprising:
    receiving a HTTP request for a transaction on the server from a browser on a client;
    invoking the application on the server to process the HTTP request;
    calling a client code generator to generate a first polling code having a first Uniform Resource Locator (URL) that includes a first set of parameters, wherein the first set of parameters comprises a delay time and a polling count;
    sending the first polling code to the browser;
    communicating the first URL in the first polling code from file browser to a server agent on the server after expiration of the delay time to request file status of file transaction;
    generating a second polling code having a second Uniform Resource Locator (URL) that identifies a second set of parameters and the transaction requested if the transaction is incomplete and the polling count does not equal a polling count limit, wherein the second set of parameters comprises the delay time and a new polling count;
    sending the second polling code to the browser; and
    communicating the second URL in the second polling code from the browser to the server after expiration of the delay time to request the status of the transaction.

2. The method of claim 1, wherein the first is processed by the sex-vet agent on the server to determine the status of the transaction.

3. The method of claim 1, further comprising directing the browser to a completion page if the transaction is complete.

4. The method of claim 1, further comprising directing the browser to an exception page if the transaction is incomplete and the polling count equals a polling count limit.

5. A program product stored on a storage unit computer readable storage medium for providing a status of a transaction with an application on a server, which when executed, comprises:
    agent program code configured to received a HTTP request for the transaction from a browser on a client, and to initiate the transaction based on the request;
    generator program code invoked by the agent program code configured to generate a first polling code having a first Uniform Resource Locator (URL) that includes a first set of parameters, wherein the first set of parameters includes a delay time and a polling count, and to send the first polling code to the client, wherein the client communicates the first URL in the first polling code to the agent program code after expiration of the delay time to request the status of the transaction;
    wherein the agent program code is further configured to process the first URL to determine the status of the transaction, and to invoke the generator program code to generate a second polling code having a second URL that identifies a second set of parameters and the transaction requested if the transaction is incomplete and the polling count does not equal a polling count limit, send the second polling code to the browser and communicate the second URL in the second polling code from the browser to the server after expiration of the delay time to request the status of the transaction, wherein the second set of parameters comprises the delay time mad a new polling count.

6. The program product of claim 5, wherein the client comprises a browser configured to receive the first polling code, and to communicate the first URL to the agent program code after expiration of the delay time.

7. The program product of claim 5, and wherein the generator program code increments the polling count of the first set of parameters by one to yield the new polling count.

* * * * *